United States Patent
Gu et al.

(10) Patent No.: US 8,159,929 B2
(45) Date of Patent: *Apr. 17, 2012

(54) LOW COMPLEXITY HIGH PERFORMANCE TMCC ACQUISITION IN ISDB-T AND ISDB-TBS RECEIVERS

(75) Inventors: Yongru Gu, Lake Forest, CA (US); Jun Ma, Irvine, CA (US)

(73) Assignee: Newport Media, Inc., Lake Forest, CA (US)

( * ) Notice: Subject to any disclaimer, the term of this patent is extended or adjusted under 35 U.S.C. 154(b) by 1031 days.

This patent is subject to a terminal disclaimer.

(21) Appl. No.: 12/046,956

(22) Filed: Mar. 12, 2008

(65) Prior Publication Data

US 2009/0232264 A1 Sep. 17, 2009

(51) Int. Cl.
*H04J 11/00* (2006.01)
*H04L 27/28* (2006.01)
*H04D 3/22* (2006.01)
*H04L 27/22* (2006.01)

(52) U.S. Cl. ......... 370/203; 370/208; 375/260; 375/329
(58) Field of Classification Search ................. None
See application file for complete search history.

(56) References Cited

U.S. PATENT DOCUMENTS

| | | | | |
|---|---|---|---|---|
| 6,810,097 | B1 * | 10/2004 | Yamagata | 375/344 |
| 7,889,803 | B2 * | 2/2011 | Gu et al. | 375/260 |
| 2005/0094739 | A1 * | 5/2005 | Takesue et al. | 375/260 |
| 2008/0152042 | A1 * | 6/2008 | Adachi | 375/330 |

* cited by examiner

*Primary Examiner* — Marcus R Smith
(74) *Attorney, Agent, or Firm* — Rahman LLC

(57) ABSTRACT

A method of TMCC information acquisition in an ISDB-T/TSB receiver comprises detecting coarse frequency offset in the receiver to identify bins that have TMCC information; and acquiring TMCC and symbol number information from the identified bins. The detecting process may be conducted using different methods and the acquiring process may be conducted using different methods. The TMCC information acquisition method saves memory space and provides enhanced performance by using coarse frequency offset to identify the bins that have TMCC information and obtaining the TMCC and symbol number information from the identified bins.

12 Claims, 9 Drawing Sheets

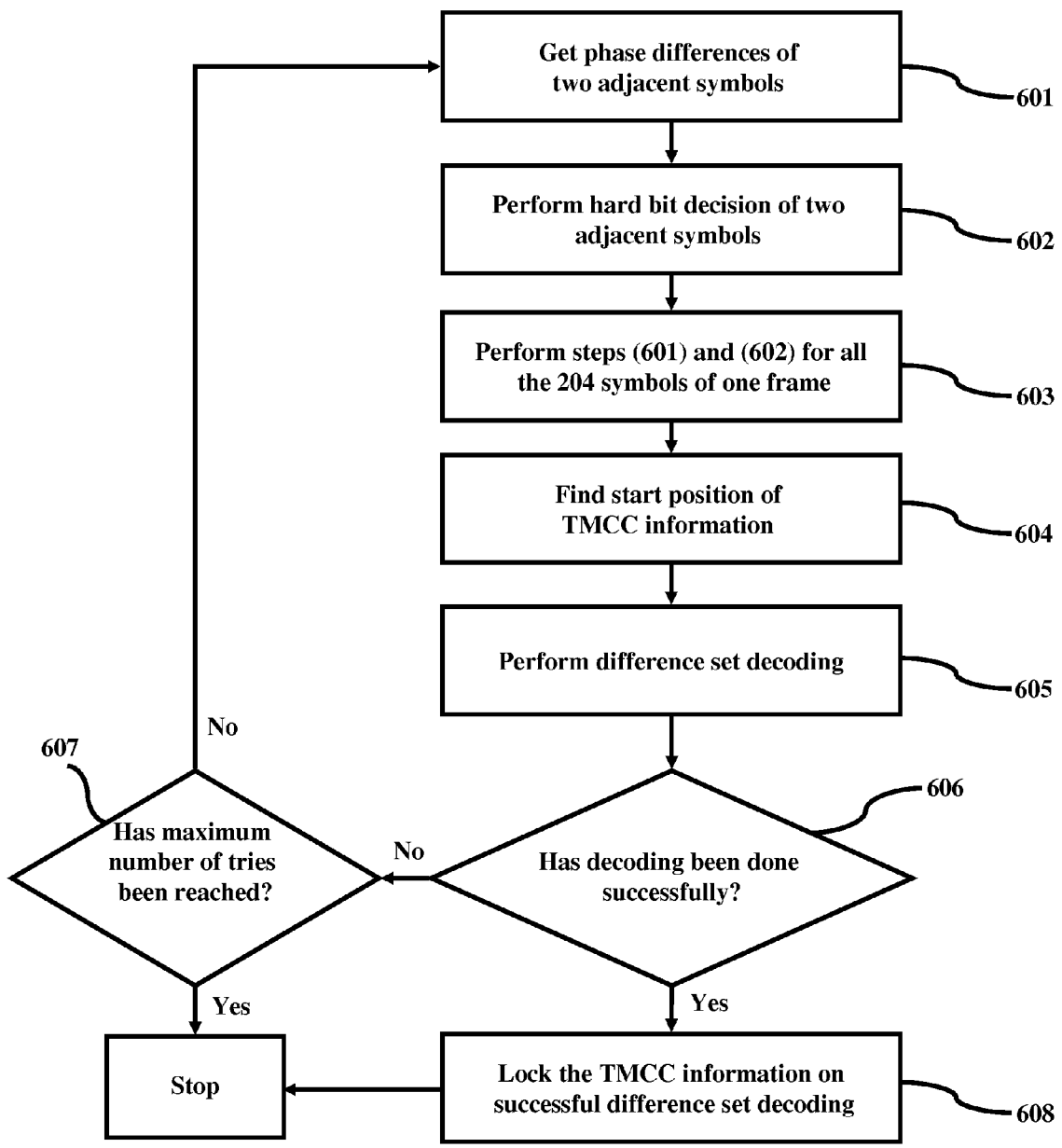

LOW COMPLEXITY HIGH PERFORMANCE TMCC ACQUISITION IN ISDB-T AND ISDB-TBS RECEIVERS

BACKGROUND

1. Technical Field

The embodiments herein generally relate to communication systems, and, more particularly, to transmission multiplexing configuration control (TMCC) acquisition in orthogonal frequency division multiplexing (OFDM) based integrated services digital broadcast terrestrial (ISDB-T)/integrated services terrestrial sound broadcast (TSB).

2. Description of the Related Art

TMCC carries information on various transmission parameters that must be acquired before successful decoding of received ISDB-T/TSB data. The same TMCC information is simultaneously transmitted over multiple sub-carriers (bins) specified by the ISDB-T/TSB, and repeated every frame (or 204 symbols).

In case there is coarse frequency offset in the receiver, the locations of the received TMCC bins are different from locations specified by the standards and therefore, wherein location difference indicates coarse frequency offset. In a straightforward method, TMCC and coarse frequency offset would be acquired at the same time, and one has to look for the TMCC information over all possible frequency offset regions. One needs to acquire and store the entire TMCC frame (containing 204 bits) for each possible coarse frequency offset. Such an approach could reduce the acquisition time slightly, but would be demanding on hardware computation and memory requirements.

SUMMARY

In view of the foregoing, an embodiment herein provides a method of TMCC information acquisition in an ISDB-T/TSB receiver and program storage device readable by computer, tangibly embodying a program of instructions executable by the computer to perform the method of TMCC information acquisition in an ISDB-T/TSB receiver, wherein the method comprises detecting coarse frequency offset in the receiver to identify bins that have TMCC information; and acquiring TMCC and symbol number information from the identified bins.

The detection of coarse frequency offset may comprise computing a phase difference of two adjacent symbols for all TMCC and auxiliary channel (AC) bins over a plurality of symbols; compensating resulting phase differences; mapping the compensated phase differences to numeric numbers; accumulating the mapped numeric numbers; and comparing the accumulated results for each candidate of coarse frequency offset. The mapping of the compensated phase differences may comprise mapping a compensated phase difference to 1 when the compensated phase difference is between 315° to 45° or between 135° to 225°. Additionally, the mapping of the compensated phase differences may comprise mapping a compensated phase difference to −1 when the compensated phase difference is between 45° to 135° or between 225° to 315°.

Alternatively, the detection of coarse frequency offset may comprise computing a phase difference of two adjacent symbols for all TMCC bins over a total number of symbols; compensating resulting phase differences; making a decision on a statistically most likely phase difference; subtracting each compensated phase difference from the statistically most likely phase difference; mapping the subtracted phase differences to numeric numbers; accumulating the mapped phase differences; and comparing the accumulated results for each candidate coarse frequency offset. The mapping of the subtracted phase differences may comprise mapping a subtracted phase difference to 1 when the corresponding subtracted phase difference is between −90° to 90°. Furthermore, the mapping of the subtracted phase differences may comprise mapping a subtracted phase difference to −1 when the corresponding subtracted phase difference is between from 90° to −90°.

In the detection of the coarse frequency offsets, the resulting phase differences may be compensated based on a phase difference between candidate frequency offset and Fast Fourier Transform (FFT) center bin. Also, in the detection of the coarse frequency offsets, the TMCC bins may be binary phase shift key (BPSK) modulated. Moreover, in the detection of the coarse frequency offsets, the AC bins may be binary phase shift key (BPSK) modulated. Also, in the detection of the coarse frequency offsets, a maximum of the accumulated results preferably indicates the coarse frequency offset.

The acquiring of TMCC information may further comprise receiving phase differences of two adjacent symbols; performing a hard bit decision on two adjacent symbols; repeating phase difference receiving of two adjacent symbols and performing hard bit decision of received two adjacent symbols for all symbols of one frame; storing the hard bit decision of adjacent symbols; finding a start position of the TMCC information; conducting difference set decoding of decoded TMCC bits; locking the TMCC information on successful difference set decoding; and executing the receiving, performing, and repeating steps until the TMCC information is locked or a predetermined maximum number of attempts of locking are reached. Preferably, in the acquiring of the TMCC information, the hard bit decision is made based on weighted phase difference of all TMCC bins. Furthermore, in the acquiring of the TMCC information, the start position of the TMCC information may be found using a match filter.

Alternatively, the acquiring of the TMCC information comprises receiving phase differences of two adjacent symbols; performing a soft bit decision on the symbols; conducting a hard bit decision on the symbols; storing the hard bit decision of the symbols; passing the soft decision through a match filter on the symbols; storing the output of the match filter of the symbols; executing the receiving through storing of the output of the match filter of the symbol steps for all the symbols of one frame; comparing match filter outputs and a position of an output with a largest magnitude to find a start position of the TMCC information and a symbol number; completing difference set decoding on a sliced decision of the received TMCC soft information; and locking the TMCC information on successful difference set decoding. Moreover, the acquiring of the TMCC information may further comprise conducting a second receiving of phase differences of two adjacent symbols; conducting a second performing of a soft decision on the symbols; averaging and the soft decision with soft decision obtained 204 symbols previously; storing the average soft decision; passing the soft decision through a match filter on the symbols; flipping the sign of output of the matched filter; accumulating the flipped output with output obtained 204 symbols previously; conducting a second comparing of match filter outputs and a position of an output with a largest magnitude to find the start position of the TMCC information and a symbol number; completing difference set decoding on a sliced decision of the received TMCC soft information; conducting a second locking of the TMCC information on successful difference set decoding; and executing the receiving through second conducting of locking of the TMCC information until the TMCC information is locked or a predetermined maximum number of attempts of locking are reached. Preferably, in the acquiring of the TMCC information, the start position of the TMCC information may be found using a SYNC word match filter.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIG. 6 is a flowchart illustrating a first method of acquiring TMCC information in an ISDB-T/TSB receiver used in accordance with the embodiments herein;

DETAILED DESCRIPTION OF PREFERRED EMBODIMENTS

Figure 1:
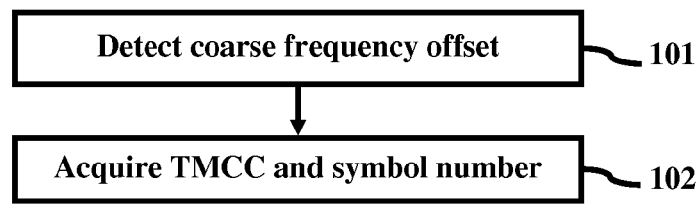
FIG. 1 is a flowchart illustrating a method of TMCC acquisition according to the embodiments herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein provide TMCC acquisition methods that require less memory and provides higher performance than conventional techniques. Referring now to the drawings, and more particularly to FIGS. 1 through 8, where similar reference characters denote corresponding features consistently throughout the figures, there are shown preferred embodiments.

FIG. 1 is a flowchart illustrating a method of TMCC acquisition according to the embodiments herein. Once coarse frequency offset is detected (101), bins with TMCC information are known and only the bins need to be looked for TMCC information. The bins are checked (102) for TMCC information and the information and corresponding symbol number is acquired.

In ISDB-T/TSB, TMCC and AC bins are Binary Phase Shift Keying (BPSK) modulated. In an ideal case the phase across two adjacent symbols on a TMCC bin or AC bin is supposed to be either 0° or 180°. Based on observations mentioned above, two methods are provided herein to detect the coarse frequency offset.

Figure 2:
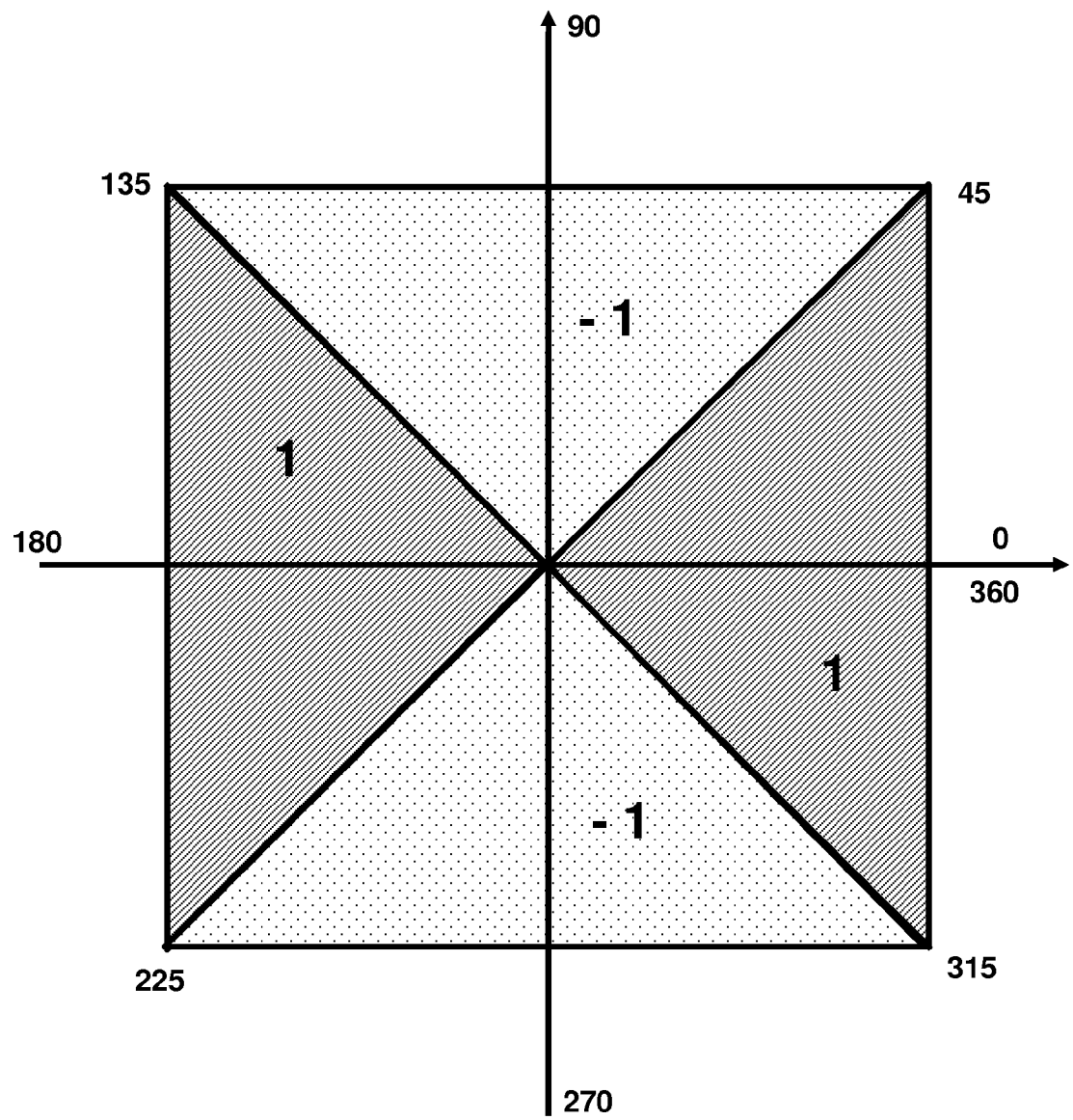
FIG. 2 illustrates the mapping of compensated phase differences.
Figure 3:
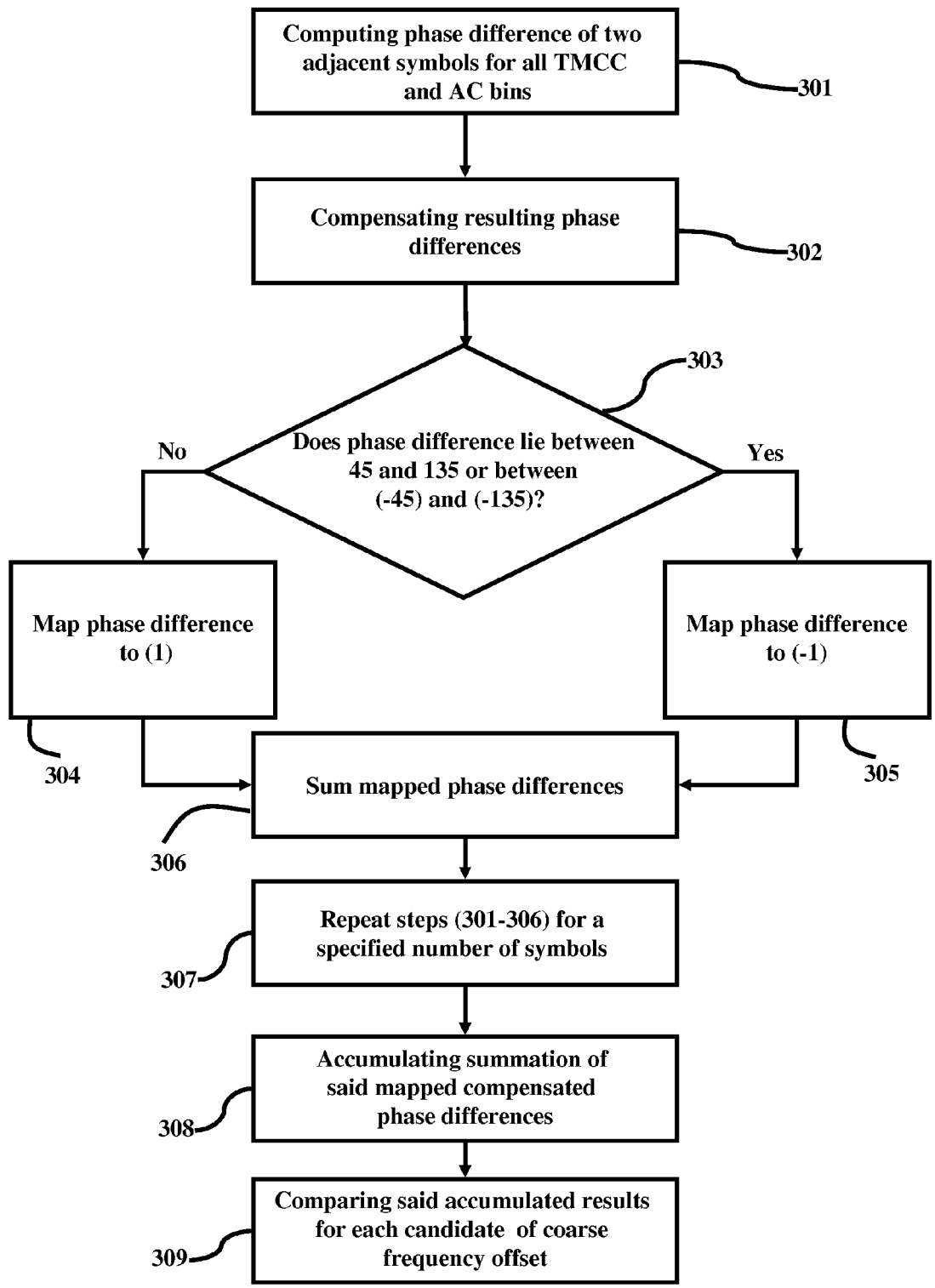
FIG. 3 is a flowchart illustrating a first method of detecting coarse frequency offset in ISDB-T/TSB receivers.

Referring to FIG. 3, which is a flowchart illustrating a method for detecting coarse frequency offset according to a first embodiment, wherein the method is preferably suitable for an ISDB-T/TSB transmission mode 2. The phase difference of two adjacent symbols is computed (301) for all corresponding TMMC and AC bins. The phase difference is compensated (302) based on the difference between candidate frequency offset and the Fast Fourier Transform (FFT) of the center bin. The compensated phase difference is then checked (303) for its location in an x-y coordinate system, as shown in FIG. 2. If the phase difference is between (45°) and (135°) or between (−45°) and (−135°) (Yes), then the phase difference is mapped (305) to (−1), else (No) the phase difference is mapped (304) to (1). All the mapped phase differences for all TMCC and AC bins for that candidate frequency offset is then summed (306). Steps (301-306) are repeated (307) for a specified number of symbols for the candidate frequency offset. To reduce the time required to lock TMCC information, a small number of symbols are required. But using a small number of frequency offsets can result in a lock on a false coarse frequency offset. Hence, there is a trade off between locking time and locking performance. Thus, there is a need to achieve a balance between locking time and performance. Also, the number of the symbols also depends on the number of TMCC and AC bins of a symbol. If the number of TMCC and AC bins of a symbol is large, a small number of symbols can be used. For each candidate offset, the mapped phase differences are accumulated (308). The accumulation results for each candidate frequency offset are compared (309), with the true frequency offset being a candidate frequency offset with the maximum accumulation result.

Figure 4:
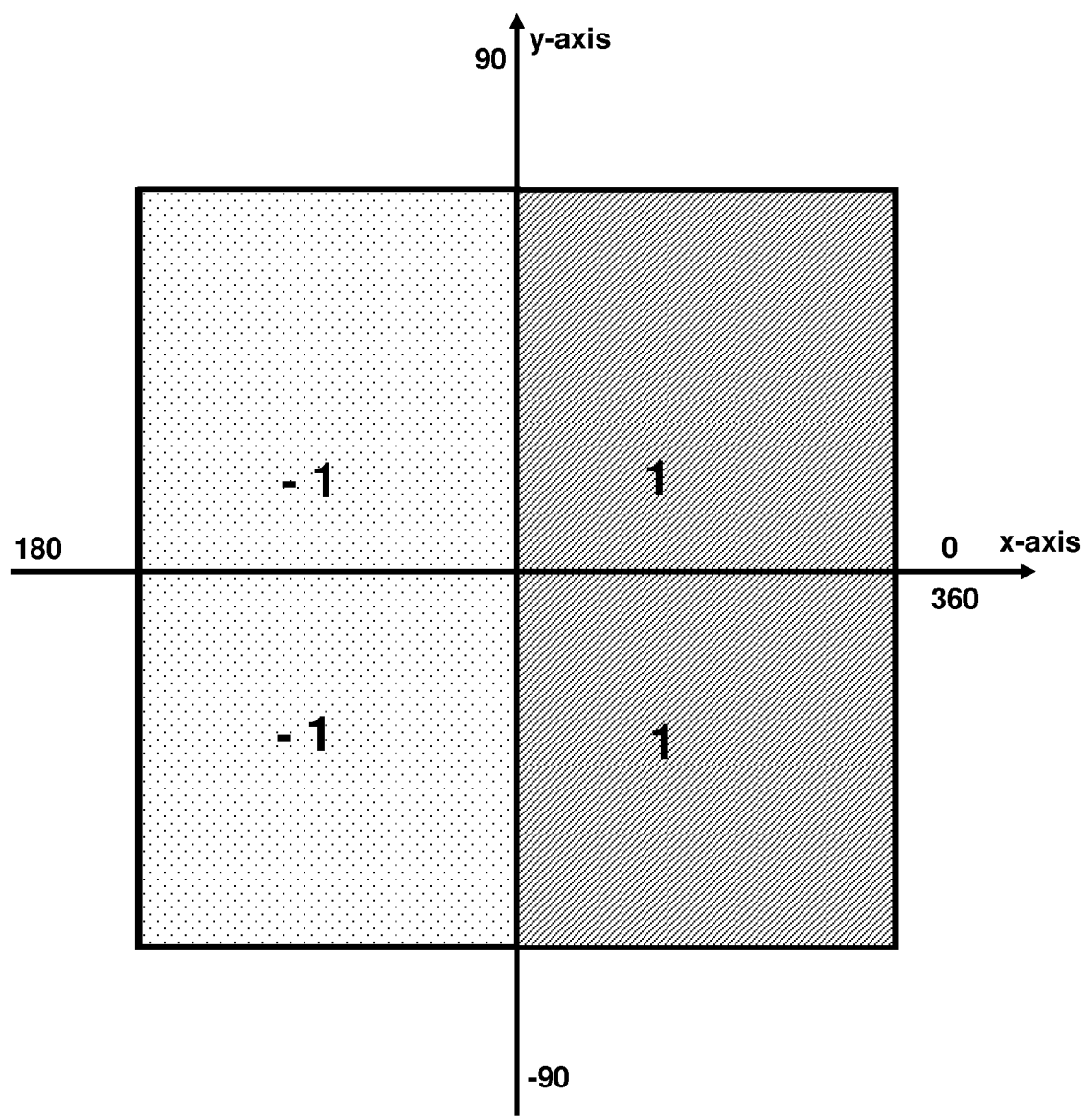
FIG. 4 illustrates the mapping of subtracted phase differences.
Figure 5:
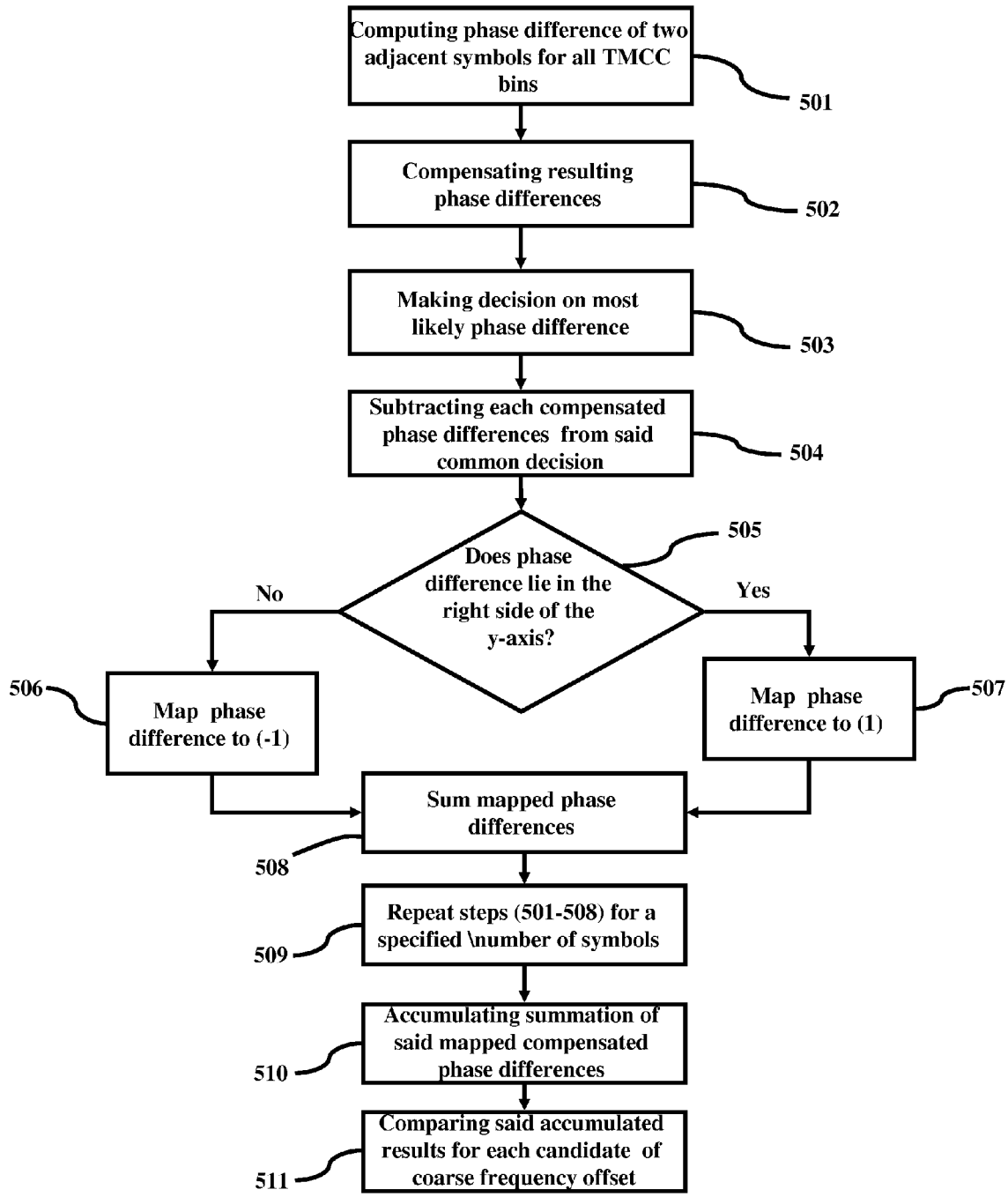
FIG. 5 is a flowchart illustrating a second method of detecting coarse frequency offset in ISDB-T/TSB receivers.

Referring to FIG. 5, which is a flowchart according to an embodiment of a method for detecting coarse frequency offset, wherein the method is preferably suitable for ISDB-T/TSB mode 3 and high Doppler and noisy channels. The phase difference of two adjacent symbols is computed (501) for corresponding TMMC bins. The phase difference is compensated (502) based on the difference between a candidate frequency offset and a FFT of the center bin. A common decision is made (503) based on the most likely phase difference that has been transmitted on the TMCC bins based on phase difference. In an ideal case, the phase differences for different TMCC bins should be the same as all TMCC bins carry the same TMCC information. The compensated phase differences are subtracted (504) by this common decision. In an ideal case, new phase difference should be 0. The new phase difference is then checked (505) for its location in an x-y coordinate system, as shown in FIG. 4. If the phase difference is to the right side of y-axis (i.e., positive x-axis) (Yes), then the phase difference is mapped (507) to (1), else (No) the phase difference is mapped (506) to (−1). Next, all the mapped phase differences for all TMCC and AC bins for that candidate frequency offset are summed (508). Steps (501-508) are repeated (509) for a specified number of symbols for the candidate frequency offset. To reduce the time required to lock TMCC information, a small number of symbols are required. But using a small number of frequency offsets can result in a lock on a false coarse frequency offset. Hence, there is a trade off between locking time and locking performance. Thus, there is a need to achieve a balance between locking time and performance. Additionally, the number of symbols also depends on the number of TMCC and AC bins of a symbol. If the number of TMCC and AC bins of a symbol is large, a small number of symbols can be used. For each candidate offset, the mapped phase differences are accumulated (510). The accumulation results for each candidate frequency offset are compared (511), with the true frequency offset being a candidate frequency offset with the maximum accumulation result.

Once coarse frequency offset is locked, it is known which bins carry TMCC information. FIG. 6 shows a flow diagram illustrating the method of acquiring TMCC information in an ISDB-T/TSB receiver (not shown) used in accordance with the embodiments herein. First, the phase difference of adjacent symbols is obtained (601). A hard bit decision is made (602) based on the weighted phase difference of all the TMCC bins, and the hard bit decision is stored. Steps (601) and (602) are then repeated (603) for one frame (204 symbols) to obtain 204 bits. A match filter (not shown) (based on the SYNC and SYNC_bar word) is used to detect (604) the bit from which the TMCC information starts. After determining the TMCC information, a difference set decoding process is performed (605). In this regard, the TMCC information is protected by a specific channel coding, and that channel coding is called the difference set coding. There are many channel coding methods, such as Reed-Solomon coding, Turbo coding, Convolutional coding, difference set coding, etc. The decoding process of the difference set coding is called difference set decoding. The decoding can help to correct errors in the received TMCC information. If the TMCC information is successfully decoded (606) (Yes), then the TMCC is locked (608). The starting position of the decoded TMCC information indicates the current symbol number. If the TMCC information has not been successfully decoded (No) and the maximum number of tries has not been reached (No) (607), then the method beginning with step (601) is repeated again until either the TMCC information has been successfully decoded or a predetermined maximum number of tries have been reached (Yes).

Figure 7A:
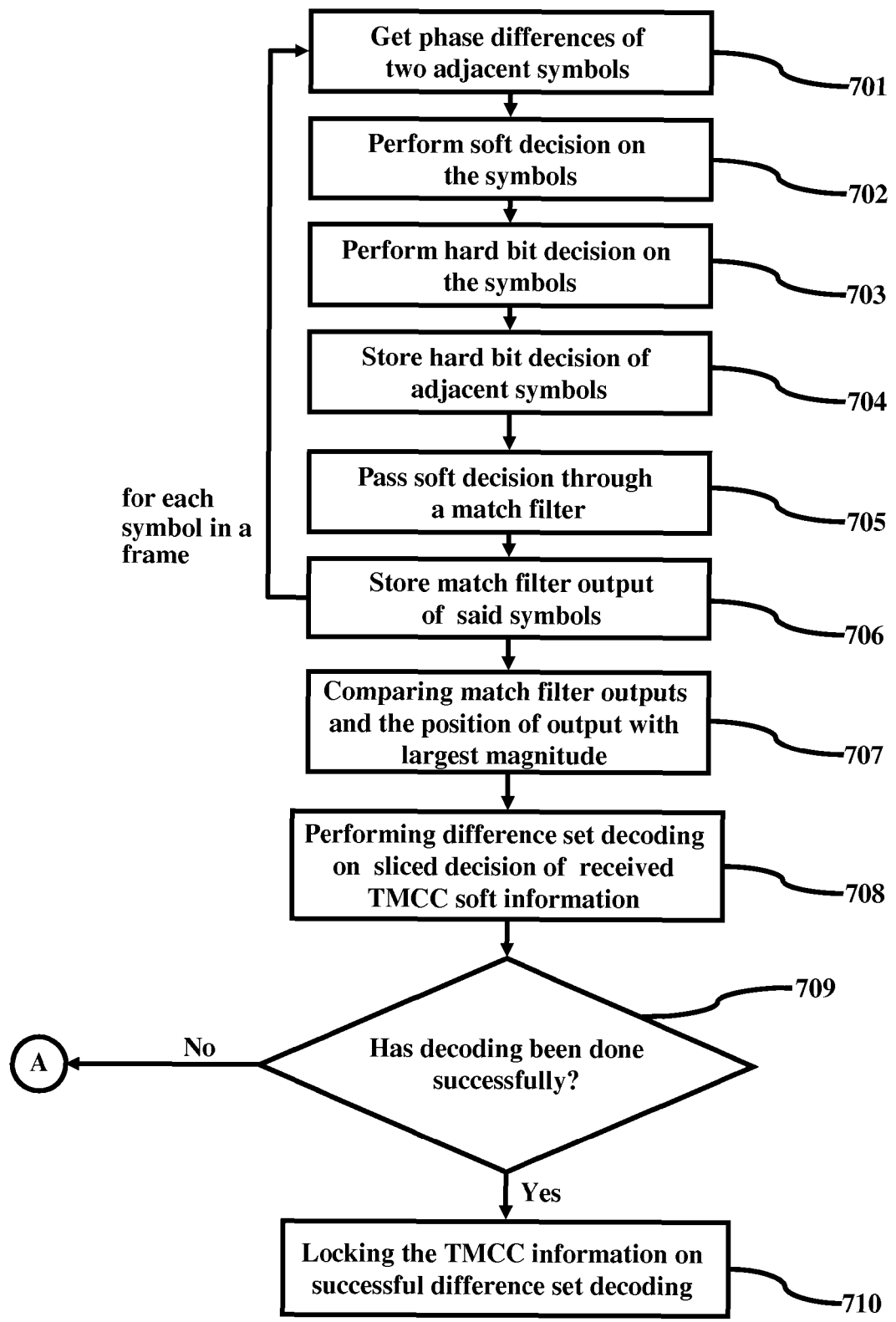
FIGS. 7A through 7C are flowcharts illustrating a second method of acquiring TMCC information in an ISDB-T/TSB receivers used in accordance with the embodiments herein.
Figure 7B:
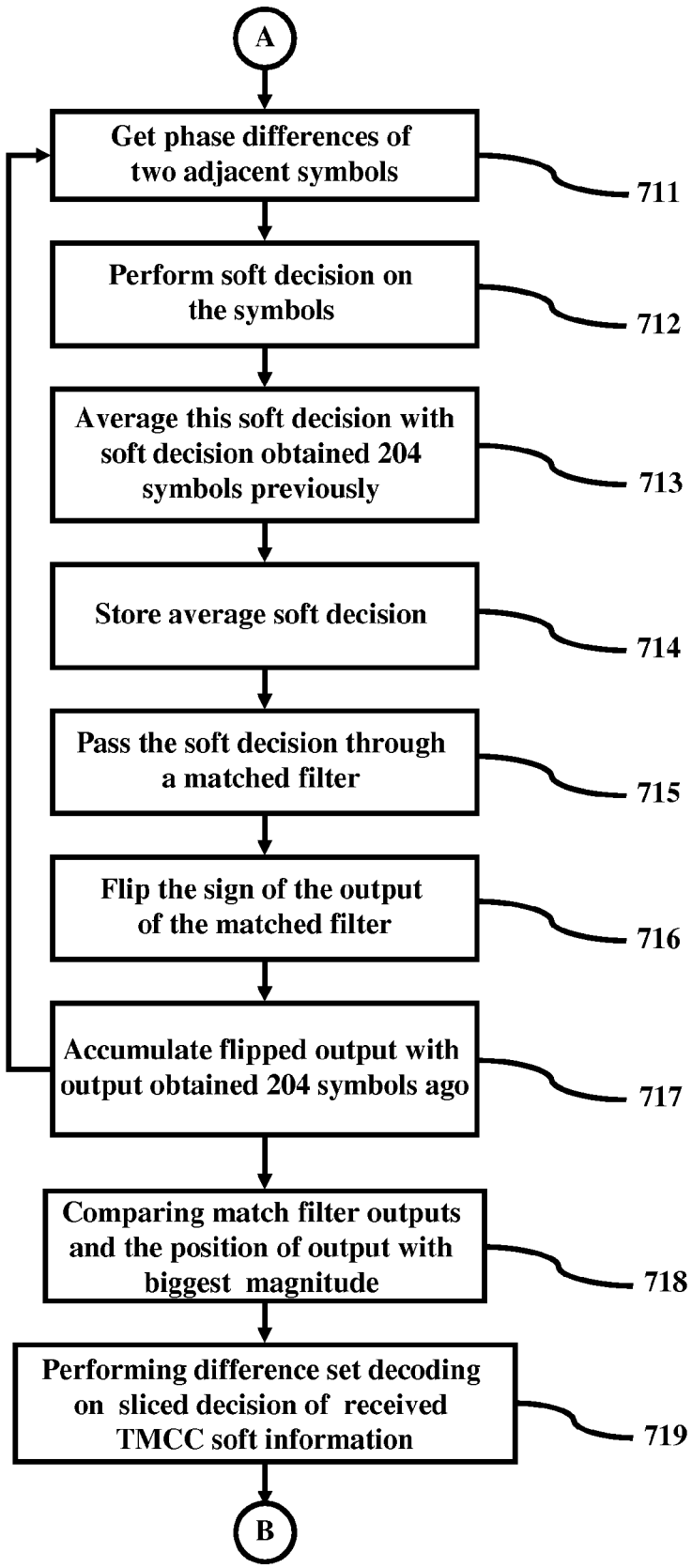
Figure 7C:
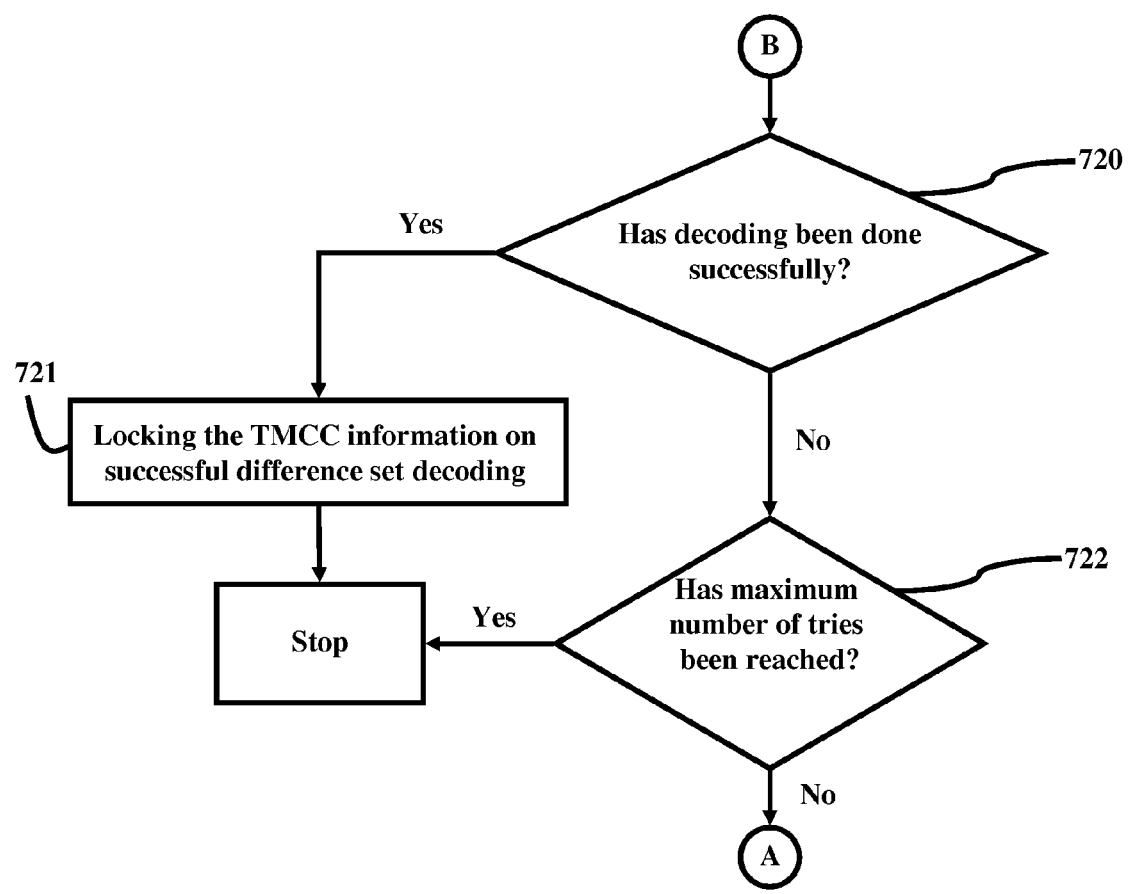

Once coarse frequency offset is locked, it is known which bins carry TMCC information. FIGS. 7A through 7C are flow diagrams illustrating a method of acquiring TMCC information in an ISDB-T/TSB receiver used in accordance with the embodiments herein. The phase difference of adjacent symbols is first obtained (701). A soft decision is made (702) based on the weighted phase difference of all TMCC bins and the soft decision or a hard slicing of the soft decision is passed (705) to a SYNC word match filter (not shown) and the output of the filter is stored (706). However, prior to steps (705-706), a hard bit decision is made (703) based on the weighted phase difference of all the TMCC bins and the hard bit decision is stored (704). Steps (701) through step (706) are repeated for one frame (204 symbols) to obtain 204 bits. The output of the match filters and position of the outputs are compared (707) with the largest magnitude to acquire the symbol number and starting position of the TMCC information. After determining TMCC information, a difference set decoding process is performed (708) on the sliced decision of the received TMCC soft information. If the TMCC information is successfully decoded (709), then the TMCC is locked (710). The starting position of the decoded TMCC information indicates the current symbol number. If the TMCC information has not (No) been successfully decoded (709), then the phase differences of two adjacent symbols for all TMCC bins are obtained (711) and a soft decision is made (712) on the phase differences. The soft decision is averaged (713) with the soft decision obtained 204 symbols previously and the average soft decision is stored (714). The soft decision is also passed (715) through the matched filter. The sign of the output of the matched filter is flipped (716). For every 204 symbols, the sign of the output of the matched filter is flipped. The output is accumulated (717) with the output obtained 204 symbols previously and the accumulated match filter output is stored. On accumulating the filter outputs for a certain number of symbols, the 204 accumulated matched filter outputs and position of the output is compared (718) with biggest magnitude to acquire the symbol number and starting position of TMCC information. After determining the TMCC information, a difference set decoding process is performed (719) on the sliced decision of the received TMCC soft information. If the TMCC information is successfully decoded (720) (Yes), then the TMCC is locked (721). Otherwise (No), it is determined whether a predetermined maximum number of tries has been reached (722). The process concludes upon reaching this predetermined maximum number of tries (Yes). Otherwise (No), the process repeats at step (711).

The techniques provided by the embodiments herein may be implemented on an integrated circuit chip (not shown). The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The embodiments herein can take the form of an entirely hardware embodiment, an entirely software embodiment or an embodiment including both hardware and software elements. The embodiments that are implemented in software include but are not limited to, firmware, resident software, microcode, etc.

Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 8:
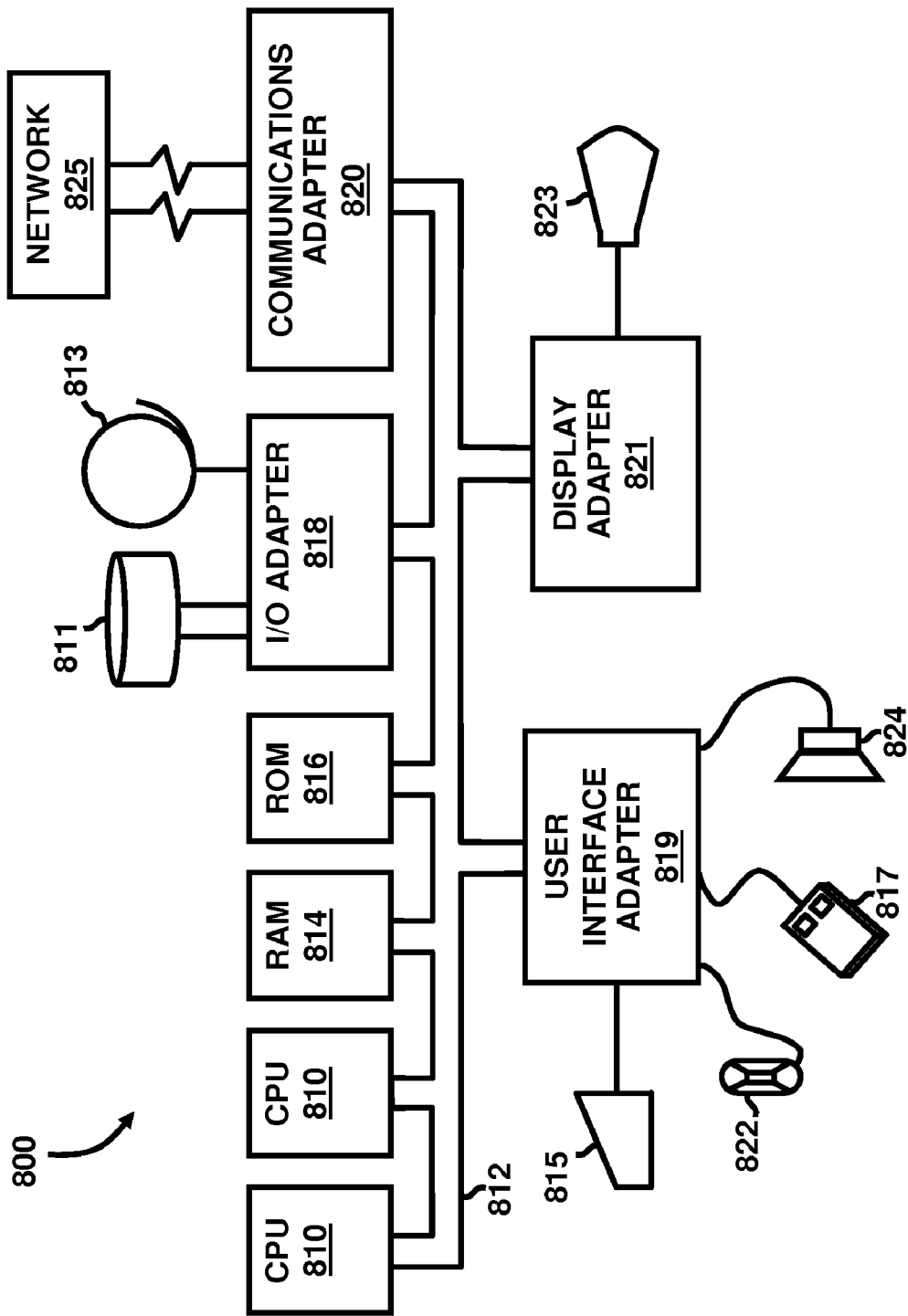
FIG. 8 is a diagram of a computer architecture used in accordance with the embodiments herein.

A representative hardware environment for practicing the embodiments herein is depicted in FIG. 8. This schematic drawing illustrates a hardware configuration of an information handling/computer system 800 in accordance with the embodiments herein. The system 800 comprises at least one processor or central processing unit (CPU) 810. The CPUs 810 are interconnected via system bus 812 to various devices such as a random access memory (RAM) 814, read-only memory (ROM) 816, and an input/output (I/O) adapter 818. The I/O adapter 818 can connect to peripheral devices, such as disk units 811 and tape drives 813, or other program storage devices that are readable by the system 800. The system 800 can read the inventive instructions on the program storage devices and follow these instructions to execute the methodology of the embodiments herein. The system 800 further includes a user interface adapter 819 that connects a keyboard 815, mouse 817, speaker 824, microphone 822, and/or other user interface devices such as a touch screen device (not shown) to the bus 812 to gather user input. Additionally, a communication adapter 820 connects the bus 812 to a data processing network 825, and a display adapter 821 connects the bus 812 to a display device 823 which may be embodied as an output device such as a monitor, printer, or transmitter, for example.

The embodiments herein provide methods of TMCC acquisition that requires lesser memory and provides higher performance. The embodiments herein achieve this by providing a TMCC information acquisition methods that requires less memory and provides higher performance than conventional solutions by using coarse frequency offset to identify bins that have TMCC information and obtaining TMCC and symbol number information from the identified bins.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A method of transmission multiplexing configuration control (TMCC) information acquisition in an integrated service digital broadcasting terrestrial/terrestrial sound broadcast (ISDB-T/TSB) receiver, said method comprising:
   computing a phase difference of two adjacent symbols for all TMCC and auxiliary channel (AC) bins over a plurality of symbols;
   compensating resulting phase differences;
   determining whether a particular phase difference lies between 45° to 135° or between 225° to 315°;
   mapping the compensated phase differences to numeric numbers;
   summing the mapped compensated phase differences;
   repeating the computing through summing steps for a specified number of symbols;
   accumulating the summation of said mapped compensated phase differences; and
   comparing the accumulated results for each candidate of coarse frequency offset in said receiver.

2. The method of claim 1, wherein the mapping of said compensated phase differences comprises mapping a compensated phase difference to 1 when said compensated phase difference is between 315° to 45° or between 135° to 225°.

3. The method of claim 1, wherein the mapping of said compensated phase differences comprises mapping a compensated phase difference to −1 when said compensated phase difference is between 45° to 135° or between 225° to 315°.

4. The method of claim 1, further comprises:
   receiving phase differences of two adjacent symbols;
   performing a hard bit decision on two adjacent symbols;
   repeating phase difference receiving of two adjacent symbols and performing hard bit decision of received two adjacent symbols for all symbols of one frame;
   storing said hard bit decision of adjacent symbols;
   finding a start position of a TMCC information;
   conducting difference set decoding of decoded TMCC bits;
   locking said TMCC information on successful difference set decoding; and
   executing the receiving, performing, and repeating steps until said TMCC information is locked or a predetermined maximum number of attempts of locking are reached.

5. The method of claim 1, further comprises:
   receiving phase differences of two adjacent symbols;
   performing a soft bit decision on said symbols;
   conducting a hard bit decision on said symbols;
   storing said hard bit decision of said symbols;
   passing said soft decision through a match filter on said symbols;
   storing the output of said match filter of said symbols;
   executing the receiving through storing of said output of said match filter of said symbol steps for all the symbols of one frame;

comparing match filter outputs and a position of an output with a largest magnitude to find a start position of a TMCC information and a symbol number;
completing difference set decoding on a sliced decision of the received TMCC soft information; and
locking said TMCC information on successful difference set decoding.

6. The method of claim 5, further comprises:
conducting a second receiving of phase differences of two adjacent symbols;
conducting a second performing of a soft decision on said symbols;
averaging and said soft decision with soft decision obtained 204 symbols previously;
storing said average soft decision;
passing said soft decision through a match filter on said symbols;
flipping the sign of output of said matched filter;
accumulating said flipped output with output obtained 204 symbols previously;
conducting a second comparing of match filter outputs and a position of an output with a largest magnitude to find said start position of said TMCC information and a symbol number;
completing difference set decoding on a sliced decision of the received TMCC soft information;
conducting a second locking of said TMCC information on successful difference set decoding; and
executing the receiving through second conducting of locking of said TMCC information until said TMCC information is locked or a predetermined maximum number of attempts of locking are reached.

7. A method of transmission multiplexing configuration control (TMCC) information acquisition in an integrated service digital broadcasting terrestrial/terrestrial sound broadcast (ISDB-T/TSB) receiver, said method comprising:
computing a phase difference of two adjacent symbols for all TMCC bins over a total number of symbols;
compensating resulting phase differences;
making a decision on a statistically most likely phase difference;
subtracting each compensated phase difference from said statistically most likely phase difference;
determining whether said compensated phase difference is between 0° to 90° and 270° to 360°;
mapping the subtracted phase differences to numeric numbers;
summing the mapped compensated phase differences;
repeating the computing through summing steps for a specified number of symbols;
accumulating the summation of said mapped phase differences; and
comparing the accumulated results for each candidate coarse frequency offset in said receiver.

8. The method of claim 7, wherein the mapping of said subtracted phase differences comprises mapping a subtracted phase difference to 1 when the corresponding subtracted phase difference is between −90° to 90°.

9. The method of claim 7, wherein the mapping of said subtracted phase differences comprises mapping a subtracted phase difference to −1 when the corresponding subtracted phase difference is between from 90° to −90°.

10. A non-transitory program storage device readable by computer, tangibly embodying a program of instructions executable by said computer to perform a method of transmission multiplexing configuration control (TMCC) information acquisition in an integrated service digital broadcasting terrestrial/terrestrial sound broadcast (ISDB-T/TSB) receiver, said method comprising:
computing a phase difference of two adjacent symbols for all TMCC and auxiliary channel (AC) bins over a plurality of symbols;
compensating resulting phase differences;
determining whether a particular phase difference lies between 45° to 135° or between 225° to 315°;
mapping the compensated phase differences to numeric numbers;
summing the mapped compensated phase differences;
repeating the computing through summing steps for a specified number of symbols;
accumulating the summation of said mapped compensated phase differences; and
comparing the accumulated results for each candidate of coarse frequency offset in said receiver.

11. The program storage device of claim 10, further comprises:
receiving phase differences of two adjacent symbols;
performing a hard bit decision on two adjacent symbols;
repeating phase difference receiving of two adjacent symbols and performing hard bit decision of received two adjacent symbols for all symbols of one frame;
storing said hard bit decision of adjacent symbols;
finding a start position of a TMCC information;
conducting difference set decoding of decoded TMCC bits;
locking said TMCC information on successful difference set decoding; and
executing the receiving, performing, and repeating steps until said TMCC information is locked or a predetermined maximum number of attempts of locking are reached.

12. The program storage device of claim 10, further comprises:
receiving phase differences of two adjacent symbols;
performing a soft bit decision on said symbols;
conducting a hard bit decision on said symbols;
storing said hard bit decision of said symbols;
passing said soft decision through a match filter on said symbols;
storing the output of said match filter of said symbols;
executing the receiving through storing of said output of said match filter of said symbol steps for all the symbols of one frame;
comparing match filter outputs and a position of an output with a largest magnitude to find a start position of a TMCC information and a symbol number;
completing difference set decoding on a sliced decision of the received TMCC soft information; and
locking said TMCC information on successful difference set decoding.

* * * * *

UNITED STATES PATENT AND TRADEMARK OFFICE
CERTIFICATE OF CORRECTION

| | |
|---|---|
| PATENT NO. | : 8,159,929 B2 |
| APPLICATION NO. | : 12/046956 |
| DATED | : April 17, 2012 |
| INVENTOR(S) | : Yongru Gu and Jun Ma |

It is certified that error appears in the above-identified patent and that said Letters Patent is hereby corrected as shown below:

On the front page, Item (54) next to the listing for the Title of the invention: please delete "LOW COMPLEXITY HIGH PERFORMANCE TMCC ACQUISITION IN ISDB-T AND ISDB-TBS RECEIVERS" and in its place, please insert -- LOW COMPLEXITY HIGH PERFORMANCE TMCC ACQUISITION IN ISDB-T AND ISDB-TSB RECEIVERS --.

In column 1, lines 1-3, please delete "LOW COMPLEXITY HIGH PERFORMANCE TMCC ACQUISITION IN ISDB-T AND ISDB-TBS RECEIVERS" and in its place, please insert -- LOW COMPLEXITY HIGH PERFORMANCE TMCC ACQUISITION IN ISDB-T AND ISDB-TSB RECEIVERS --.

Signed and Sealed this
Fifth Day of June, 2012

David J. Kappos
*Director of the United States Patent and Trademark Office*